Dec. 22, 1970 R. C. MACHLER 3,550,148

PROCESS FOR RECORDING DIGITAL INFORMATION SO AS TO PROVIDE AN ANALOG REPRESENTATION OF SUCH INFORMATION

Filed Dec. 24, 1968 2 Sheets-Sheet 1

INVENTOR
RAYMOND C. MACHLER

BY Kemon, Palmer & Estabrook
ATTORNEYS

Dec. 22, 1970 R. C. MACHLER 3,550,148

PROCESS FOR RECORDING DIGITAL INFORMATION SO AS TO PROVIDE AN ANALOG REPRESENTATION OF SUCH INFORMATION

Filed Dec. 24, 1968 2 Sheets-Sheet 2

INVENTOR
RAYMOND C. MACHLER

BY Kemon, Palmer & Estabrook
ATTORNEYS

United States Patent Office 3,550,148

Patented Dec. 22, 1970

3,550,148

PROCESS FOR RECORDING DIGITAL INFORMATION SO AS TO PROVIDE AN ANALOG REPRESENTATION OF SUCH INFORMATION

Raymond C. Machler, Old Forty Foot Road, P.O. Box 22, Lansdale, R.D. 1, Pa. 19446

Filed Dec. 24, 1968, Ser. No. 786,690
Int. Cl. G01d *9/08*
U.S. Cl. 346—1 3 Claims

ABSTRACT OF THE DISCLOSURE

There is disclosed herein a new process for recording digital information in digital form while at the same time providing an analog showing of changes in the information being recorded. According to the invention, numbers are represented by character elements where the elements are arranged in geometric arrays by decade. For example, the numerals or digits 1 through 9 are represented by dots or the like arranged in either a diamond or triangular array. Those decades representing the least significant numerals to be recorded are arranged on a record receiver by novel means such that they provide an analog representation of the information.

FIELD OF THE INVENTION

The invention relates to a process for plotting digital data and it in particular relates to such a process whereby digital data is presented in such a fashion that the least significant digit to be recorded is arranged to provide an analog representation of changes in information inputted to the recording system.

THE PRIOR ART

Prior art patents show that most time-dependent information in the past has been recorded in analog form, regardless of the nature of the information, that is, the input information might very well be digital information, but it was used to effect the movement of a stylus on a record receiver such that an analog presentation of the information was provided. Such systems are deficient in that the digital information is lost in the recording process.

More recently, processes have been devised for the purpose of recording digital information in such a fashion as to present an analog picture of the information being recorded while retaining the digital input. Such processes have been deficient for a first reason in that they all require the recording material, e.g. paper, to have information indicia thereon, e.g., the material must have lines, scales with attendant horizontal and/or vertical divisions, and the like.

The processes of the prior art have also been deficient for the reason that a user of the record produced might easily err in retrieving information from the record. For example, the processes of the prior art require as many as twenty-seven character elements to represent a number having three significant digits such as the numbers 999., 99.9, 9.99, etc. Further, the said prior art processes are deficient in that they do not provide true analog representations of immediate changes in input information; rather the analog depicted either utilizes more significant information and thus depicts long term change, or it is segmented. In either case, the true analog curve is not represented. When the analog representation is made with more significant information the deficiency is particularly crucial for the reason that most users of the systems require an analog representation of current changes in input information as the data is being recorded. Such representations are best made with that input data that represents least significant digits.

OBJECTS OF THE INVENTION

Accordingly, it is the basic object of this invention to provide a new and improved process for recording digital information in such a fashion as to retain the digital information while at the same time providing a highly accurate analog representation of changes in the infromation.

It is another object of this invention to provide a new recording process whereby each digit to be recorded is represented by no more than five elements with the elements for each part of the number arranged in decade groups.

It is a further object of this invention to provide a new recording process whereby digital information is printed in decade form, there being no more than five character elements for each numeral of a given decade, and where the character elements in each decade are arranged according to a diamond shaped array when the input information is changing smoothly such that a straight line joining character elements representing numerals 1 and 9 will pass through elements representing at least three other numerals in the array.

It is an additional object of this invention to provide a new recording process whereby character elements of any given decade of numerical information are arranged according to a triangular array when the input information is changing smoothly such that a straight line joins all of the final character elements in the array.

It is another object of this invention to provide a teaching of a particular type of printing wheel that may be utilized to produce a record according to the process of this invention, and to provide a portable scale for utilization in reading specific digital information recorded according to the process of this invention.

These and other objects of the invention will become apparent upon a reading of the hereinafter disclosure taken in conjunction with the drawings wherein:

FIG. 1A shows one method of utilizing the format of the invention in conjunction with a recording machine having a scale and a movable indicator;

FIGS. 1B, 1C, and 1D are enlarged partial views of the format shown in FIG. 1A;

With reference to FIG. 1, a piece of recording paper 10 having information thereon printed according to the process of this invention is shown in a recorder. It will be noticed that the paper is unlined; it is not necessary, when the recording process of this invention is used, to have indicia of any type on the record medium. If it becomes necessary to retrieve the information while it is being recorded, the user may refer to the usual scale 12 and indicator 14 provided with the recorder to facilitate such retrieval.

Figure 5A:
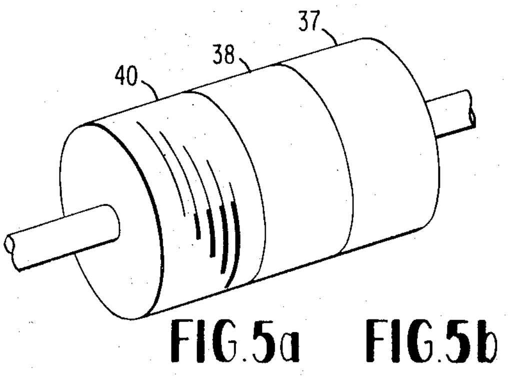
FIGS. 5A, 5B and 5C show a specific printing apparatus that may be employed to produce a format according to either FIGS. 1 or 4.
Figure 5B:
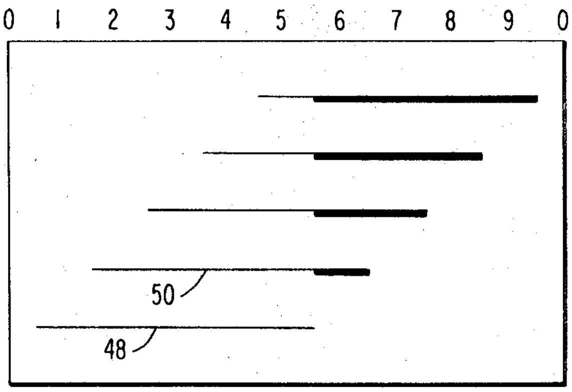
Figure 5C:
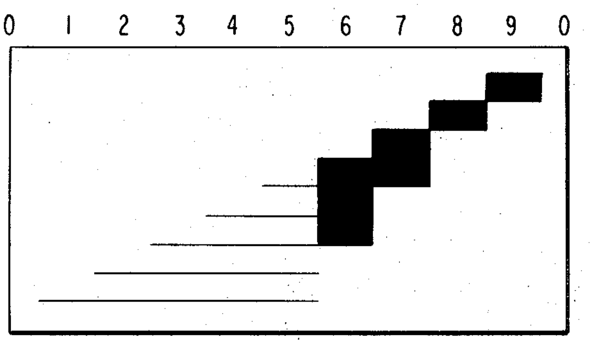

The recorder is not fully shown for the reason that the process of the invention may be employed with recorders presently on the market. However, if the recorder is of the printing type, such as an electric typewriter or the like, it will be necessary to alter the type bars or printing head with respect to digits. Specific examples of types of printing heads that may be employed in the process of the invention are shown in FIGS. 5A–5C of the drawings. The heads shown in FIG. 5 comprise a plurality of type wheels that are geared together such that the wheel representing the least significant digits to be recorded must make a specific number of revolutions, e.g. 10, in order that the printing wheel for printing the next least significant digit can make one revolution. The next wheel in line has a type face precisely like the type face on the first or least significant wheel; however, it is used to print second to most or second to least significant digits if only three digits are used for the numbers being recorded. The precise type faces employed on the printing heads of FIG. 5 will be described below.

The printing heads of FIG. 5 may be arranged for linear movement on a lead screw such that the head, when at the extreme left of the recorder, is used to print input information of the lowest order, and when it is at the extreme right of the scale it is used to print information of the highest order.

The head can be made to traverse the scale under the command of digital logic connected to receive and process input information. For example, assuming that the recorder functions to record information from a single source, that information would represent a number to be recorded at a given position on the paper 10 relative to the scale 12. The information may be entered into a counter by the usual circuitry where the counter output is connected through conventional circuitry to move the head either right or left depending on the number by causing the lead screw to turn through a specific angle related to the number. When the head is positioned, an output signal generated by the circuitry employed to turn the lead screw is utilized to effect a printing of the data.

Figure 1A:
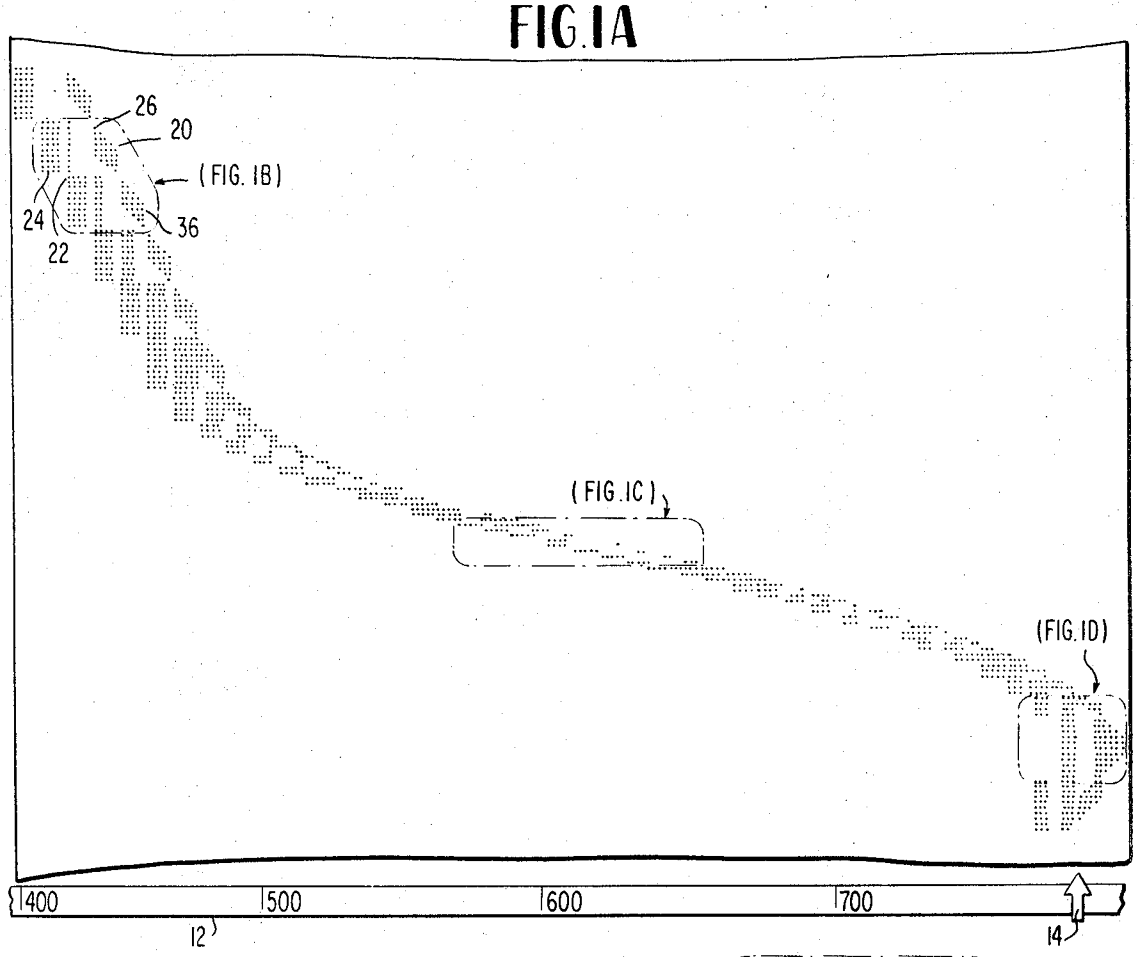

A portion of a record produced according to one embodiment of the invention is shown in FIG. 1A. The method according to the invention in its basic form is more readily discernible from FIG. 1B of the drawings which represents an enlarged view of a portion of the recording of FIG. 1 and specifically shows the numbers 410 through 430 as recorded by the process according to this invention.

Figure 1B:
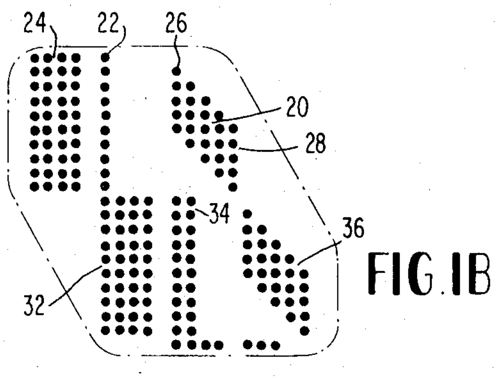
Figure 3:
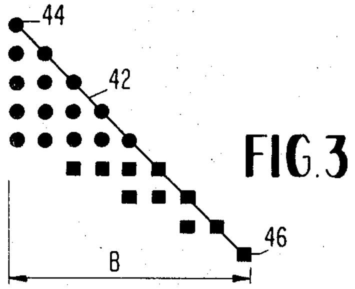
FIG. 3 is a showing of a basic array according to the process of this invention wherein a triangular format is employed.

As shown in FIG. 1B, the numbers 410–419 are represented by three separate and distinct blocks of character elements 20, 22 and 24. The basic element employed is a dot character 26. According to the process of this invention, any digit from one through nine may be represented by a group of character elements not exceeding five in number when the said elements are arranged in either a diamond shaped array 20 or in a triangular shaped array as shown in FIG. 3.

Referring to the block of information 20, it will be noticed that the single character 26 is in the upper left hand corner of the block. The single character represents the numeral 1. Numerals two through five are represented by a like number of dot elements two through five respectively. Thus, in block 20 the numeral two is represented by the horizontally spaced dots located beneath the element 26 where the first of the two dots representing the numeral two is vertically aligned with the dot 26.

Figure 2:
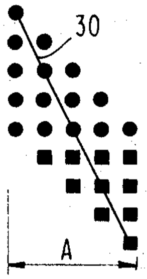
FIG. 2 is a showing of a basic array of the process of this invention wherein a diamond format is employed.

The numerals 6 through 9 are also represented by dots, although they may be represented by other geometric shapes, as is shown in FIG. 2. In order that no more than five character elements be used, the numerals 6 through 9 are represented by complements. Thus the numeral 6 may be taken as 10 less 4 and it, like the numeral four, is represented by four dots. Similarly, the numeral 7 may be taken as 10 less 3 and it, like the numeral three, may be represented by three dots.

Figure 4:
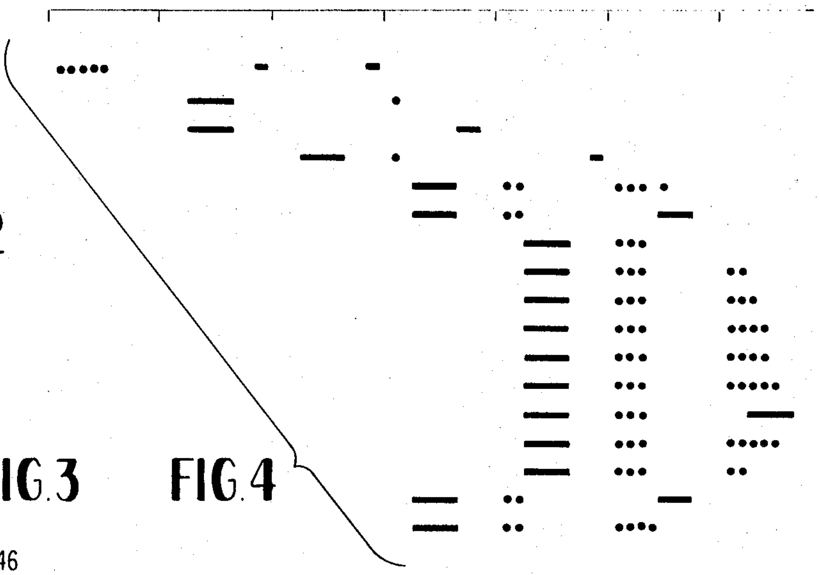
FIG. 4 is a view of a second method according to the invention wherein a record employing the triangular array is shown.

In order to readily distinguish character elements representing the numerals 6 through 9 from those representing the numerals 1–4, it is best to either represent one or the other by a difference. For example, complements may be represented by dot elements that are twice as large as the dot elements used for numerals 1 through 5. The printing wheels shown in FIGS. 5A and 5B are provided with type faces for printing the dots in this manner. As shown in FIGS. 3 and 4, complements are represented by lines, the length of which determines the numeral printed. In FIG. 2, complements are represented by rectangles or squares.

As is shown in FIG. 1B, the numeral 6 is represented by four horizontally aligned dot elements 28, which elements are vertically displaced from the five dots representing the numeral 5 with the first dot for the numeral 6 being in vertical alignment with the second dot of the numeral 5. Similarly, the first dots for each of the character representations of numerals 7 through 9 are in vertical alignment with the second dots of the character representations of the numerals 6 through 8 respectively.

From the foregoing description of the block 20 of FIG. 1B and the manner in which the numerals 1–9 may be represented, it should be apparent that a complete decade of information is to be recorded in a geometrical configuration or array which may be characterized as diamond shaped. This particular shape is one of two chosen for description purposes in that it lends itself to providing an analog representation of the digital information. It will be noticed that a straight line 30, FIG. 2, connecting the dot characters representing the numerals 1 and 9 passes through the middle dot characters of the representations for numerals 3, 5 and 7 and thus bisects the diamond array. When the array of FIG. 2, or the block 20 of FIG. 1B, is viewed at a distance, the entire array will appear to the human eye as if it is a line, such as the line 30, and in that regard the recording appears to be an analog recording.

According to the present process, the least significant digits of the information recorded are printed to the right as shown in FIG. 1B. More significant digits are registered immediately to the left; for example, if the numbers being recorded span the range 410 to 419, then the second most significant numeral would be 1 and likewise the third, and most significant numeral, would be 4. As shown in FIG. 1B of the drawings, a column of dots 22 is arranged to the left of the diamond array 20, and the column 22 is utilized to represent the second most significant digit. In a like manner, the numeral 4 is represented by a column of dots 24 grouped in fours and located to the left of the column 22.

In retrieving the information, if one starts reading the top row of dots from left to right of each of columns or blocks 24 and 22 it will be noticed that no dot appears to the right of the top element in column 22. However, when the second horizontal line is read, the dot appearing in column 22 is followed on the right by a dot in the diamond array 20. Accordingly, the second number is 411 and the number next preceding it is 410. According to the process of this invention, zeros are represented by spaces.

In order that the continuous analog representation appear, it is necessary when the diamond array is used to increment the printing head one step to the right for each higher order decade of information. Thus to print the representations of numerals in the range 420 through 429, shown as columns 32, 34 and diamond array 36 in FIG. 1B, the head shown in FIG. 5A should be stepped by the lead screw to the right for a distance equal to the width of a print wheel 37 and the space between wheels. In moving the printing head the stated distance, the wheel 37 will turn through a complete revolution, thus causing a wheel 38 to turn one tenth of a revolution. The printing wheel 38 is used to print the second least or second most significant numeral and consequently when the head (or paper carriage) is activated for a printing operation, the wheel 38 will now effect the printing of two dot characters. If each of the numbers 420 through 429 are printed, the wheel 38 produces the column 34. In that the wheel 38 has been turned a total of only two tenths of a revolution, a wheel 40 for printing the most significant digit will not have turned and will continue to print fours.

Figure 1D:
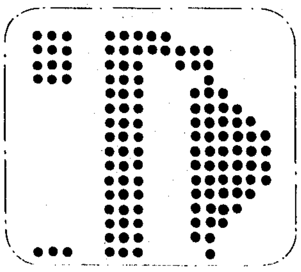
Figure 1C:
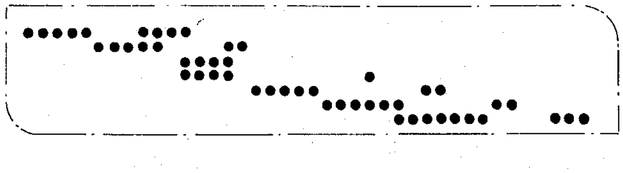

It should be obvious by now that as additional information is inputted to the recording system, the printing head will be incremented to the right or left by whatever number of decades are called for to print coded representations of the information. FIGS. 1C and 1D are enlarged views of ranges of numerals from 582–637 and 772 through a peak and back to 779 respectively, taken from FIG. 1.

As shown in FIG. 1C at the upper left hand corner, five dots are followed by a space and then by four dots. Taken by themselves the four dots could seem to represent any of several numbers. But since the present embodiment is being described relative to a three printing wheel, print head and since the four dots are preceded by a group of five dots, the four dots could at most represent either the numerals 93, 82, 71 or 6. In the embodiment of the invention being described, the spacing between the type for printing the first dot on wheel 37, and the type for printing the fifth or last dot on the wheel 38 is equal to the spacing between type bars on any of the wheels 37, 38 or 40.

Accordingly, and referring to FIG. 1C, the space between the last dot of the group of five dots and the first or left hand dot of the group of four dots is equivalent to the space for three dots. Since the space is equivalent to three dots, the first two dots of the group of four must be read as the complement of 2, or, i.e., the numeral 8 and the number is 82.

It would be well to note at this point a difference in the character of the information shown in FIGS. 1B and 1C. In FIG. 1B, the input information is increasing smoothly by individual steps or increments. That being the case, the decades of least significant digits are complete and appear in a pattern that is recognizable as a diamond. However, in FIG. 1C, the information being represented is changing rapidly, and accordingly, the decades representative of least significant digits are incomplete. In point of fact, in FIG. 1C, seven different least significant decades are represented, as follows: 2 for the number 582; 1 for the number 591; a blank for the number 600; 9 for the number 609; 8 for the number 618; 8 for the number 628, and 7 for the number 637.

It is not necessary that the individual decades of information for any given number be spaced as described above or as shown. However, to minimize the chances of error in retrieving information the characters for the more significant digits should be spaced reasonably close to the characters forming the analog curve, i.e., the characters representing the least significant digits. For convenience, the user of the process may wish to increase the distance between the first and last type bars of each of the printing wheels.

Although it is believed that the manner in which the diamond array should be read is apparent by now, two more brief examples will be given.

Turning to FIG. 1D, it will be seen that the upper characters comprise three dots followed by a space and five dots. Since the plot has progressively increased (see arrow 14 on scale 12), the three dots must represent the complement of 3 or, i.e., 7. The spacing between the left hand group of dots is sufficient for two dots thus the next or second most significant digit is the complement of three, i.e., it is 7. Finally, two dots are left and they must represent the digit 2, and the number is 772.

It will be seen that the curve peaks out at a number 784 and then slowly turns down. The last number shown is three dots (7) followed by two dot spaces and three dots (7), which in turn is followed by four dot spaces and one dot (9), i.e., the number 779.

A second embodiment of the process is shown in FIGS. 3, 4 and 5C. According to this embodiment, the characters are arranged in a triangular array (FIG. 3) such that a straight line 42, drawn from a character element 44 representing the numeral 1 and the character element 46 representing the numeral 9, will pass through the final character elements for each of the numerals 2 through 8. With this embodiment, the analog representation is given by an envelope formed by the right hand side of the array; thus, and as with the diamond process, the least significant digits are used to form the analog. The triangular format is very useful in situations where the record, during recording, is viewed from a relatively close position and where it is not essential that the precise figures being recorded be read with any great frequency.

With the triangular array, the first five numerals of a decade are printed as heretofore explained with reference to the diamond array. The complements, however, are displaced such that the last dot element for each of numerals 6 through 9 moves by one space to the right. Thus the first dot of the characters representing the numeral 6 is vertically displaced from and aligned with the third dot of the numeral five. Similarly, the first dot of the numeral 7 is aligned with the next to last dot of the numeral 6; the first dot of the numeral 8 is aligned with the last dot of the numeral 7, and the only dot for the numeral 9 is horizontally and vertically displaced from the last dot of the numeral 8.

A plot of numbers 599 through a peak of 636, using the diamond array, is shown in FIG. 4. The information may be retrieved in much the same fashion as previously explained with reference to FIG. 1. As shown in FIGS. 3 and 4, the total horizontal space required by a decade of information in the triangular array would appear to be greater than the spacing required for the same information represented by a diamond array. This appearance is created by the fact that, in the drawings, the horizontal spacing between the dot elements in each type of array is shown as equal, thus the total spacing shown for a decade in the diamond array is equivalent to a type face width equal to A and, for the triangular array, it is equivalent to a type face having a width B. In actual practice, the width of the type face, e.g., the width as shown in FIGS. 5B and 5C, can be the same for each type of array. In this event the horizontal spacing between dot elements used in the triangular array would be less, as is shown in FIG. 5C. It should be noted that for all spacing bar machines the type face width for a dot or the like should be only slightly smaller than the space bar interval in order that the analog representation being printed is free of jogs; it will be recalled that zeros are not printed.

The type faces of the type wheels for producing the diamond and triangular arrays are shown in developed form in FIGS. 5B and 5C respectively. Five lines of type are shown relative to equally spaced numerals 0–9 in FIG. 5B. A first line 48 runs from a position of 0.5 to 5.5 and is used to print the first dot for each of numerals 1 through 5. A second line of type 50 is used to print the second dot elements for numerals 2 through 5. It is also used to print the first dot element of the numeral 6 and it will be noticed that that portion of the type used to print this dot is approximately twice as wide as the portion used to print the second dots of numerals 2–5. This latter feature is provided so that a user may readily discern the difference between dot elements for numerals 1–5 from those representing numerals 6–9.

It will also be noticed that each line of type is five units long from a point representing one-half of a numeral to a point representing one-half of another numeral. This feature is provided such that reasonable interpolation between numbers called for by the command counter may be achieved in the printing process. Thus, if the number in the counter is between 4.6 and 5.4, the printing wheel will print five dots.

A single wheel for printing digits so as to produce a triangular array is shown in developed form in FIG. 5C. The type width for producing the digits one through five is precisely the same as described above. Obviously, the complements could be printed by type bars that are larger than the bars used for the lower order digits. However, the face shown is of the type that may be used to generate complements as lines, e.g., the complements shown in FIG. 4. In such a case, the lines, by their length, are indicative of the value of the complement printed.

Figure 6:
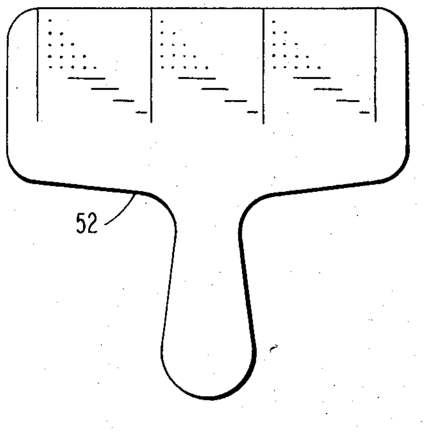
FIG. 6 is a showing of a portable scale that may be employed for retrieving digital information recorded as shown in FIG. 4.

A portable tool 52 for aiding a user to retrieve information from a record after it has been removed from the recorder is depicted in FIG. 6. It should be noted that it is only necessary that a written notation of the scale used in the recording process be made on the record. Thereafter, a user need only align the tool with any given group of decades to determine an actual reading. The triangular array is shown on the tool in each of three positions. For example, if the tool is properly aligned with the top horizontal row of dots on FIG. 4, the number 599 will be immediately apparent in that the tool 52 automatically accounts for the horizontal spacing. Obviously, a similar tool could be provided for the diamond array and no further discussion is believed necessary.

It should be apparent that a second printing head, similar to the one described, may be used to print other information in conjunction with the printing of the information utilized to provide the analog representation. For example, if the printing head providing the analog curve is printing one of the variables in an X, Y plotter, the second head can be used to print the other variable. In such a case, the second head may conveniently be mounted for independent rotation at a fixed distance from the first head. The second head could also be used to print standard information, such as time, at regular intervals during the recording process. If it is used only for printing standard information, it can conveniently be located in a fixed position at either end of the recording medium or chart traverse.

It should also be apparent that other modifications can be readily made, both in the process and the means for carrying out the process of the invention. For example, an adding machine could have its type bars provided with dot type characters to provide a broken line representation of the analog curve in either the diamond or triangular arrays. It is also possible to use the process with various types of recorders such as photographic, chemical and spark recorders. Other modifications of the invention will be apparent to those skilled in the art.

I claim:

1. A process for recording information from a source on an unlined, non-indicia bearing record receiver in the form of an analog curve wherein the instantaneous numerical values of the curve appear as a digital code indicative of the values of said source, comprising the steps of:

moving the record receiver past a recording station in the recorder, the recorder receiving said instantaneous numerical values;

providing at said recording station record producing means capable of recording said digital code by a maximum of five character elements for each decade of an instantaneous numerical value;

energizing the record producing means for each of ten succeeding increments of movement of the record receiver to record ten instantaneous numerical values, the said ten numerical values including a complete decade of least significant numerical values, as nine succeeding lines of character elements, the character elements for the decade of least significant numerical values being located in said lines according to a geometric format to thereby provide a complete and continuous record of the information from said source.

2. A process for recording information from a source on an unlined, non-indicia bearing record receiver in the form of an analog curve wherein the instantaneous numerical values of the curve appear as a digital code indicative of the values of said source, comprising the steps of:

moving the record receiver past a recording station in the recorder, the recorder receiving said instantaneous numerical values;

providing at said recording station record producing means capable of recording said digital code by a maximum of five character elements for each decade of an instantaneous numerical value;

energizing the record producing means for each of ten succeeding increments of movement of the record receiver to record ten instantaneous numerical values, the said ten numerical values including a complete decade of least significant numerical values, as nine succeeding lines of character elements, the character elements for the decade of least significant numerical values being located in said lines according to a triangular format to thereby provide a complete and continuous record of the information from said source.

3. A process for recording information from a source on an unlined, non-indicia bearing record receiver in the form of an analog curve wherein the instantaneous numerical values of the curve appear as a digital code indicative of the values of said source, comprising the steps of:

moving the record receiver past a recording station in the recorder, the recorder receiving said instantaneous numerical values;

providing at said recording station record producing means capable of recording said digital code by a maximum of five character elements for each decade of an instantaneous numerical value;

energizing the record producing means for each of ten succeeding increments of movement of the record receiver to record ten instantaneous numerical values, the said ten numerical values including a complete decade of least significant numerical values, as nine succeeding lines of character elements, the character elements for the decade of least significant numerical values being located in said lines according to a diamond format to thereby provide a complete and continuous record of the information from said source.

References Cited

UNITED STATES PATENTS 3,039,101 6/1962 Perdue -------------- 346—1

JOSEPH W. HARTARY, Primary Examiner

U.S. Cl. X.R.

197—1; 346—66